Figure 1:
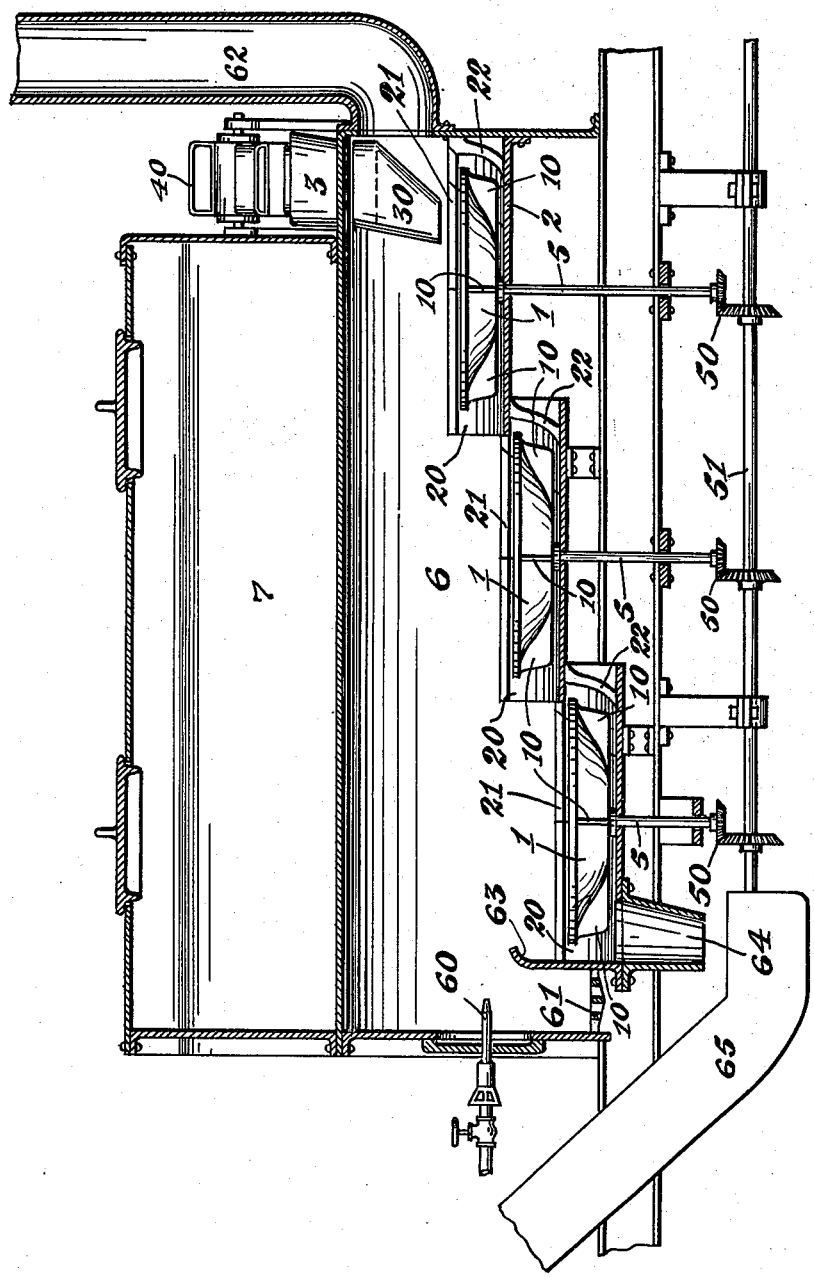

J. G. CROSS.
APPARATUS FOR DRYING GRANULAR MATERIALS.
APPLICATION FILED MAR. 25, 1915.

1,157,087.

Patented Oct. 19, 1915.
2 SHEETS—SHEET 1.

WITNESSES:
James E. Sproll.
George H. Morse.

INVENTOR.
Joseph G. Cross.
BY
Adams & Reynolds.
ATTORNEYS.

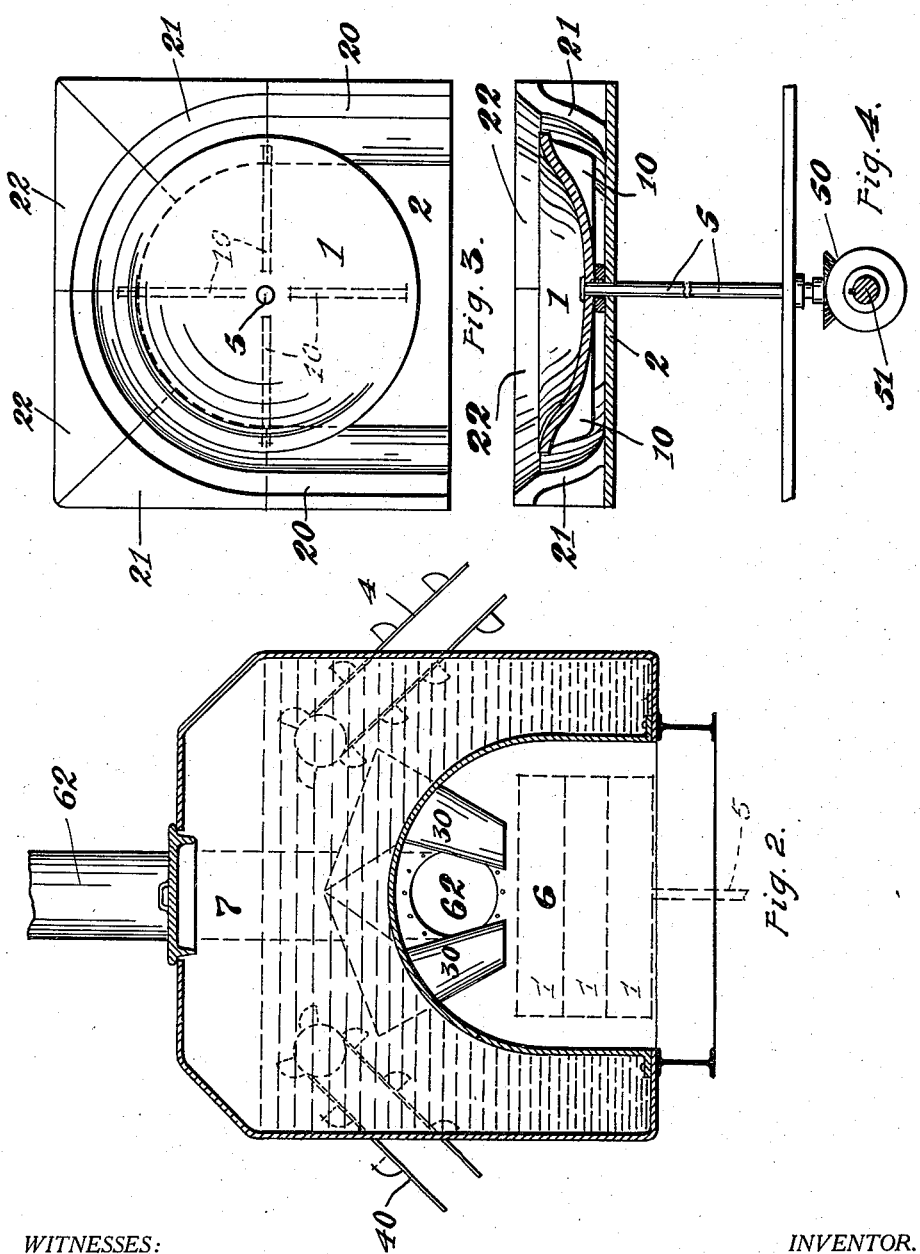

UNITED STATES PATENT OFFICE.

JOSEPH G. CROSS, OF SEATTLE, WASHINGTON, ASSIGNOR OF ONE-HALF TO RAYMOND W. FENN, OF SEATTLE, WASHINGTON.

APPARATUS FOR DRYING GRANULAR MATERIALS.

1,157,087.     Specification of Letters Patent.     Patented Oct. 19, 1915.

Application filed March 25, 1915. Serial No. 16,847.

*To all whom it may concern:*

Be it known that I, JOSEPH G. CROSS, a citizen of the United States of America, and a resident of the city of Seattle, in the county of King and State of Washington, have invented certain new and useful Improvements in Apparatus for Drying Granular Materials, of which the following is a specification.

My invention relates to an apparatus for drying granular materials and has been especially designed for handling sand and gravel, although it may be employed to advantage in drying other materials of like physical characteristics.

The object of my invention is to provide a drier which will efficiently dry such material and have a large capacity.

In the accompanying drawings I have shown the form of construction which is now preferred by me.

Figure 1 is a longitudinal sectional elevation of the drier and its operating mechanisms. Fig. 2 is a transverse sectional elevation of the same parts. Fig. 3 is a plan view of one end of the floor of the drying chamber showing the revolving pans. Fig. 4 is a transverse section through a part of Fig. 3.

The drying elements of my invention are shown separately in Figs. 3 and 4. These each consist of a shallow saucer or dish-like shape member 1 which is mounted for rotation upon its axis, said axis being placed in a substantially vertical position. Each of these drying elements is mounted closely above a floor 2 and about the margins of the revolving member is placed a set of blocks 20, 21 and 22 which are shaped so as to form a recess, conforming in general outline to the bottom and peripheral outline of the revolving member 1. The recess or pocket in which the member 1 revolves, departs from the circular shape at the side toward the next similar member in the series employed, as is clearly shown by the shape of the blocks 20. A series of members of this sort are employed, these being placed so that each member of the series is at a slightly lower level than the member next preceding it in the series, whereby each member receives the material from the member next preceding it in the series and discharges into the member next following in the series.

Each one of the revolving members 1 is provided with a set of blades 10 extending from the outer edge thereof downward and inward, to substantially fill the portion of the recess which lies below the curve of the bottom of the member 1. These blades serve to engage and sweep out from beneath the revolving disk any sand or gravel which may get beneath it.

In the drier as shown in the drawings, I have shown three of these revolving disks or saucers, located in a row. The material is discharged into the uppermost of these through spouts 30 which communicate with hoppers 3 into which the material is deposited. I have shown two such hoppers and spouts, into one of which the gravel is deposited while sand is deposited in the other, when the device is to be employed for drying these materials. I have shown two elevators 4 and 40 of an ordinary belt and bucket type, by which the materials may be elevated and discharged into the hoppers.

The several disks or pans 1 are mounted upon vertical shafts 5, and each of these shafts is connected with a main shaft 51, which extends beneath the series of pans, by means of bevel gears 50, so that all are turned together. Any other suitable means for driving these pans may be employed.

The series of pans 1 are inclosed within a structure which forms a drying chamber 6. This chamber, as illustrated, is of a rounded top and is heated by means located at the end thereof in which the lowermost of the pans 1 is located. The means for heating this chamber may be anything which is convenient and suitable. I have shown an oil or gas burner 60 which enters this end of the chamber as one means which may be employed. I have also shown a grate at 61, upon which coal may be burned if necessary. At the opposite end of the chamber 6, a stack 62 is connected by which the gases of combustion are conducted away. This stack is connected with the chamber between the spouts 30 by which the material is supplied to the drying device. The structure which forms the wall of the drying chamber, in the apparatus as illustrated, forms the inner or bottom wall of a chamber 7, which chamber serves as a tank for containing any material which it is desired to heat. In one use to which my drier is particularly applicable, that is in preparing asphalt for paving purposes, this tank may be used in which to heat the asphalt. The tank 7 is sufficiently shorter than the chamber 6, to provide space for upward passage of the material elevators 4 and 40, and the receiving hoppers 3.

At the discharge end of the drying chamber, a plate or wall 63 is provided to check the material discharge from the last of the revolving disks 1 and to direct the same into a spout 64. The material may be taken away from this spout in any desired or suitable manner. For this purpose I have indicated an elevator 65.

The operation of my device is as follows: The material is supplied in any suitable manner to the elevators 4 and 40, these elevating and discharging the material into the hoppers 3 from which the chutes 30 discharge it upon the first or uppermost of the revolving disks 1. The speed of revolution of these disks is such, with relation to their angle of curvature, that the material will be gradually worked up the side walls and be discharged therefrom, by reason of the centrifugal force generated by the revolution of the disks and communicated to the material by the friction between the same and the disk. Part of this material will be discharged directly toward and into the next disk in the series, but part of it will be discharged in other directions and will be received by the blocks 20, 21 and 22 which surround the disk in these directions. This material will roll downward toward the disk and will either fall into the disk or pass through the clearance outside of the disk and get beneath. That which falls into the disk will quickly assume sufficient momentum to be again thrown out. That which falls beneath the disk will be swept out by engagement with the vanes or ribs 10 into the disk next following in the series. In this manner there is a gradual progression of the material from the supply to the discharge end, during which it is constantly in agitation and thoroughly exposed to the heat of the gases in this chamber as well as to the heat radiated from the walls thereof. In consequence the device has a large capacity for its size.

Having thus described my invention, what I claim as new, and desire to secure by Letters Patent of the United States of America, is:

1. In a drier, a member revoluble in a substantially horizontal plane, and having wings on its lower side extending from its periphery downward to the plane of the bottom of the member, means for turning the same, and means for feeding the material to be dried upon said revoluble member.

2. In a drier, a cupped or dish-like member mounted to turn upon a substantially vertical axis, and having wings on its lower side extending from its periphery downward to the plane of the bottom of the member, means for turning the same and means for feeding the material to be dried upon said dish-like member.

3. In a drier, a member revoluble in a substantially horizontal plane, and having wings on its lower side extending from its periphery downward to the plane of the bottom of the member, means for turning the same, and means for feeding the material to be dried upon said revoluble member, and a furnace inclosing said parts.

4. In a drier, a cupped or dish-like member mounted to turn upon a substantially vertical axis, and having wings on its lower side extending from its periphery downward to the plane of the bottom of the member, means for turning the same, means for feeding the material to be dried upon said dish-like member, and means for heating said dish-like member and its contents.

5. In a drier, in combination, a series of shallow receiving members mounted to be turned each upon its respective axis, said axis being substantially vertical, and said members being located each to receive the materials discharged from the preceding one of the series, and means for heating said receiving members and the contents thereof.

6. In a drier, in combination, a series of shallow receiving members mounted to turn about substantially vertical axes and located at successively lower levels, and means for turning said receiving members.

7. In a drier, in combination, a series of shallow receiving members mounted to turn about substantially vertical axes and located at successively lower levels, and means for turning said receiving members, a chute delivering materials to the receiver at one end of the series and a chute receiving the materials from the receiver at the other end of the series.

8. In a drier for granulated materials, in combination, a series of shallow, dish-like members mounted for rotation about substantially vertical axes and disposed in a series to deliver the material to each of said members in succession, means for turning said members upon their axes, a structure forming an inclosing chamber for said revolving members, and means for heating said chamber and its contents.

9. In a drier for granulated materials, in combination, a series of shallow, disk-like members mounted for rotation about substantially vertical axes and disposed in a series to deliver the material to each of said members in succession, means for turning said members upon their axes, a structure forming an inclosing chamber for said revolving members, a fuel burning device located at one end of said chamber and a gas discharge connection at the other end.

10. In a device for drying granulated materials, a shallow, dish-like member mounted to revolve about a substantially vertical axis and having wings on its lower side extending from its periphery inward and downward to the plane of the bottom of the member, and means for turning said member about its axis.

11. In a device for drying granulated materials, a shallow, dish-like member mounted to revolve about a substantially vertical axis and having wings on its lower side extending from its periphery inward and downward to the plane of the bottom of the member, a base shaped to conform to the lower outline of said revolving member, and means for turning said revolving member.

12. In a device for drying granulated materials, a plurality of shallow, dish-like members mounted to turn about substantially vertical axes and having wings on their under sides extending from their peripheries inward and downward to the plane of the lower part thereof, a floor having pockets conforming in outline to the bottom and peripheral outlines of said revoluble members, in which pockets said revoluble members are seated, said pockets and revoluble members being disposed in series with each revoluble member at a level to receive the discharge from the floor of the revoluble member which precedes it in the series, and means for revolving said revoluble members.

13. In a device for drying granulated materials, a plurality of shallow, dish-like members mounted to turn about substantially vertical axes and having wings on their under sides extending from their peripheries inward and downward to the plane of the lower part thereof, a floor having pockets conforming in outline to the bottom and peripheral outlines of said revoluble members, in which pockets said revoluble members are seated, said pockets and revoluble members being disposed in series with each revoluble member at a level to receive the discharge from the floor of the revoluble member which precedes it in the series, means for revolving said revoluble members, a structure inclosing said revoluble members to form a heating chamber, and means for heating said chamber and its contents.

14. In a device for drying granulated materials, a plurality of shallow, dish-like members mounted to turn about substantially vertical axes and having wings on their under sides extending from their peripheries inward and downward to the plane of the lower part thereof, a floor having pockets conforming in outline to the bottom and peripheral outlines of said revoluble members in which pockets said revoluble members are seated, said pockets and revoluble members being disposed in series with each revoluble member at a level to receive the discharge from the floor of the revoluble member which precedes it in the series, means for revolving said revoluble members, a structure inclosing said revoluble members to form a heating chamber, means for heating said chamber and its contents, and means for delivering the material to the uppermost one of the series of revoluble members.

15. In a device for drying granulated materials, a plurality of shallow, dish-like members mounted to turn about substantially vertical axes and having wings on their under sides extending from their peripheries inward and downward to the plane of the lower part thereof, a floor having pockets conforming in outline to the bottom and peripheral outlines of said revoluble members, in which pockets said revoluble members are seated, said pockets and revoluble members being disposed in series with each revoluble member at a level to receive the discharge from the floor of the revoluble member which precedes it in the series, means for revolving said revoluble members, a structure inclosing said revoluble members to form a heating chamber and having a gas discharge connection with one end thereof, and a fuel burning device located at the other end of said chamber.

16. In a device for drying granulated materials, a plurality of shallow, dish-like members mounted to turn about substantially vertical axes and having wings on their under sides extending from their peripheries inward and downward to the plane of the lower part thereof, a floor having pockets conforming in outline to the bottom and peripheral outlines of said revoluble members, in which pockets said revoluble members are seated, said pockets and revoluble members being disposed in series with each revoluble member at a level to receive the discharge from the floor of the revoluble member which precedes it in the series, means for revolving said revoluble members, a structure inclosing said revoluble members to form a heating chamber and having a gas discharge connecting with one end thereof, supply chutes at the same end discharging upon the first of said revoluble members in the series.

Signed at Seattle, Washington this 17th day of March, 1915.

JOSEPH G. CROSS.

Witnesses:
HENRY L. REYNOLDS,
E. C. EGLIN.

Copies of this patent may be obtained for five cents each, by addressing the "Commissioner of Patents, Washington, D. C."